United States Patent
Abe et al.

(10) Patent No.: US 7,081,726 B2
(45) Date of Patent: Jul. 25, 2006

(54) APPARATUS AND METHOD FOR DRIVING A BRUSHLESS MOTOR

(75) Inventors: Hidefumi Abe, Tochigi-ken (JP); Takaharu Sugawara, Tochigi-ken (JP); Tsukasa Naganuma, Tochigi-ken (JP)

(73) Assignee: Keihin Corporation, Tokyo (JP)

( * ) Notice: Subject to any disclaimer, the term of this patent is extended or adjusted under 35 U.S.C. 154(b) by 300 days.

(21) Appl. No.: 10/659,396

(22) Filed: Sep. 11, 2003

(65) Prior Publication Data

US 2004/0051490 A1   Mar. 18, 2004

(30) Foreign Application Priority Data

Sep. 12, 2002   (JP) ............... 2002-266390

(51) Int. Cl.
*H02P 6/00*   (2006.01)
*F02D 41/00*  (2006.01)

(52) U.S. Cl. .................... 318/254; 123/361
(58) Field of Classification Search ........... 318/138, 318/254; 123/349, 350, 361
See application file for complete search history.

(56) References Cited

U.S. PATENT DOCUMENTS

| | | | |
|---|---|---|---|
| 4,963,800 A * | 10/1990 | Kajiwara et al. ........ 318/254 |
| 5,193,506 A * | 3/1993 | Ironside et al. ........ 123/399 |
| 5,355,373 A | 10/1994 | Salmon et al. |
| 5,777,447 A | 7/1998 | Okano |
| 5,828,193 A * | 10/1998 | Furuta ................. 318/254 |
| 5,880,565 A * | 3/1999 | Watanabe .............. 318/139 |
| 6,067,960 A * | 5/2000 | Watanabe et al. ...... 123/399 |
| 6,465,974 B1 * | 10/2002 | Watanabe .............. 318/254 |
| 2002/0060543 A1 | 5/2002 | Sugiyama et al. |

OTHER PUBLICATIONS

Patent Abstract of Japan, vol. 1997, No. 01, Jan. 31, 1997 & JP 08-242596A, Sep. 17, 1996.

* cited by examiner

*Primary Examiner*—Bentsu Ro
(74) *Attorney, Agent, or Firm*—Westerman, Hattori, Daniels & Adrian, LLP.

(57) ABSTRACT

A drive system for a brushless motor. The brushless motor includes a rotor having opposite magnetic poles on its periphery, and a stator facing the rotor. The stator has, for example, three interconnected coils at equal angular intervals. The drive system includes a memory for storing drive data which represent drive currents supplied to the respective coils at each angular position of the rotor. The drive system also includes a controller for reading those drive data which best match a target angular position of the rotor, from the memory. The controller generates drive signals based on the drive data. The drive system also includes a drive circuit for supplying the drive currents to the respective coils, based on the drive signals, respectively. The drive system can precisely control the angular position of the brushless motor.

12 Claims, 5 Drawing Sheets

APPARATUS AND METHOD FOR DRIVING A BRUSHLESS MOTOR

BACKGROUND OF THE INVENTION

1. Field of the Invention

The present invention relates to an apparatus and method for driving a brushless motor.

2. Description of the Related Art

A typical brushless motor includes a rotor having opposite magnetic poles (N pole and S pole) on its periphery and a stator having a "Y" connection of three coils. The three coils are spaced from each other by 120 degrees, and face the rotor. The N pole of the rotor covers a half surface of the rotor, and the S pole covers the other half of the rotor. If viewed in a cross section of the rotor, the N pole extends 180 degrees of the periphery of the rotor and the S pole extends the other 180 degrees. In order to rotate the brushless motor, the current angular position of the rotor is detected by a magnetic detector (e.g., Hall element), and drive currents are supplied to two of the three coils based on the current angular position of the rotor. Every time the rotor reaches a target angular position, the drive currents are supplied to appropriately selected two coils.

The conventional brushless motor is only able to control the angular position of the rotor at 60-degree intervals. Therefore, if the brushless motor is used in a mechanism to control the angular position of an electronic throttle valve of a vehicle's engine, it is not possible to precisely control the angular position of the electronic throttle valve. Relatively fine (delicate) control of the angular position may be achieved by reducing a rotation ratio of the rotor of the brushless motor by means of a gear train. For instance, the gear train can provide a gear ratio of 0.5 so that the angular position control can be carried out at 30-degree intervals. However, this way of improving the control has a limitation. Accordingly, high precision control cannot be achieved.

SUMMARY OF THE INVENTION

An object of the present invention is to provide an apparatus and method for driving a brushless motor, which can provide high precision control of an angular position of a rotor at high precision.

According to one aspect of the present invention, there is provided an improved apparatus for driving a brushless motor. The brushless motor includes a rotor having opposite magnetic poles on its periphery, and a stator facing the rotor and having at least three interconnected coils at equal angular intervals. Preferably, the number of the coils is a multiple of three (i.e., three, six, nine, . . . ). The drive apparatus of the brushless motor includes a memory for storing drive data which represent drive currents supplied to the respective coils at each of predetermined angular positions of the rotor. The drive apparatus also includes a controller for reading those drive data which best match a target angular position of the rotor, from the memory. The controller produces drive signals based on the read drive data. The drive apparatus also includes a drive circuit for supplying the drive currents to the respective coils, based on the drive signals supplied from the controller, respectively. The drive apparatus can control the angular position of the brushless motor at high precision. Consequently, it is possible to control an angular position of, for example, an electronic throttle valve which is activated by the brushless motor.

According to another aspect of the present invention, there is provided an improved method for driving a brushless motor. The brushless motor includes a rotor having opposite magnetic poles on its periphery, and a stator facing the rotor and having at least three interconnected coils at equal angular intervals. Preferably, the number of the coils is a multiple of three (i.e., three, six, nine, . . . ). The drive method includes storing, in a memory, drive data which represent drive currents supplied to the respective coils at each of predetermined angular positions of the rotor. The drive method also includes reading those drive data which best match a target angular position of the rotor, from the memory, and producing drive signals based on the drive data. The drive method also includes transmitting the read drive currents to the respective coils, based on the produced drive signals, respectively.

Other objects, aspects and advantages of the present invention will become apparent to those skilled in the art to which the present invention pertains, from the following detailed description and the appended claims taken in conjunction with the accompanying drawings.

DETAILED DESCRIPTION OF THE INVENTION

One or more embodiments of the present invention will be now described with reference to the accompanying drawings.

Figure 1:
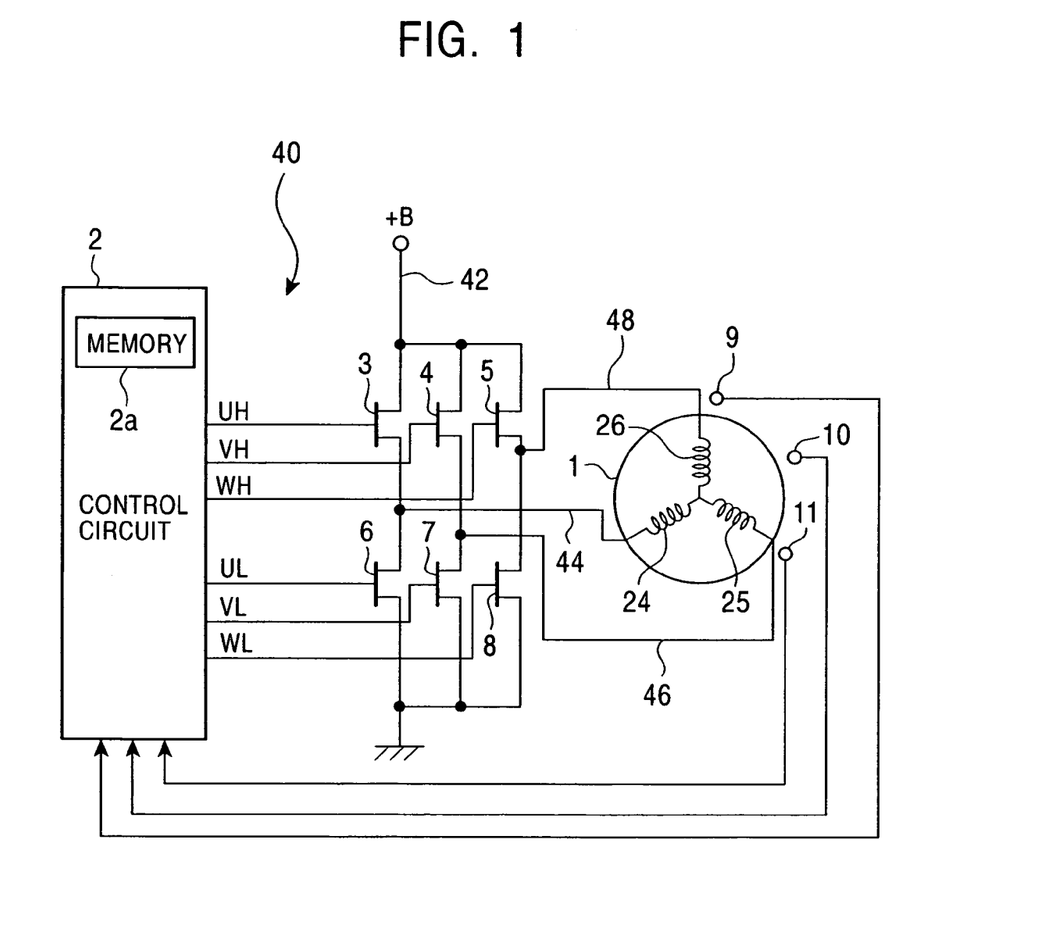
FIG. 1 illustrates a circuitry diagram of an apparatus for driving a brushless motor according to one embodiment of the present invention.

Referring to FIG. 1, a drive apparatus 40 for a brushless motor 1 is illustrated. The drive apparatus 40 controls a degree of opening of an electronic throttle valve (not shown) of an internal combustion engine of a vehicle, using the brushless motor 1, based on a degree (or stroke) of depression of an accelerator pedal (not shown). The drive apparatus 40 includes a control circuit 2 and a plurality of FETs (field-effect transistors) 3 to 8 to rotate the brushless motor 1. The FETs form in combination a drive circuit.

Figure 2:
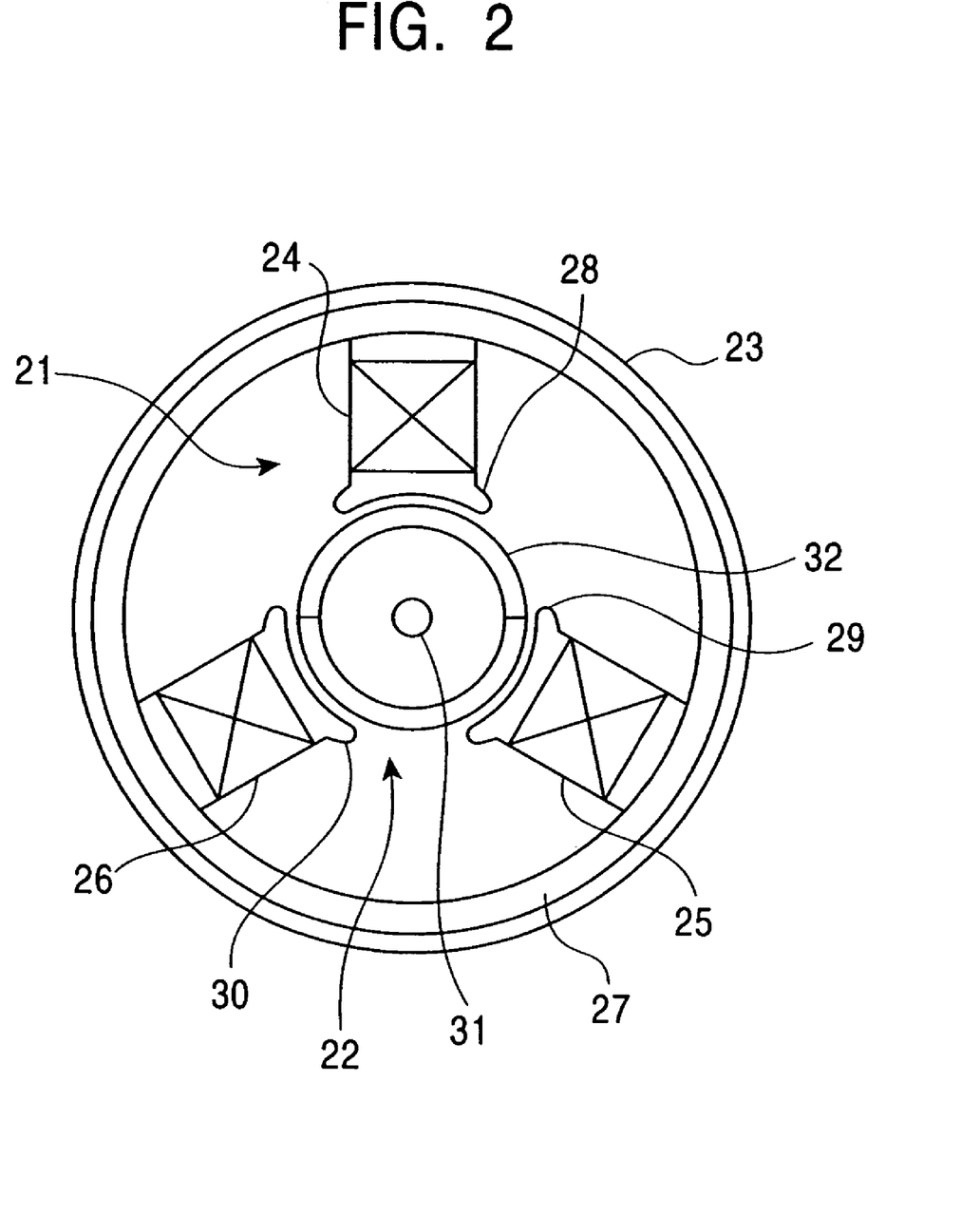
FIG. 2 illustrates a structure of the brushless motor shown in FIG. 1.

Referring to FIG. 2, the brushless motor 1 includes a stator 21 and a rotor 22, both housed in a cylindrical casing 23. The stator 21 includes an iron core 27 having three inwardly projecting elements 28 to 30. Three coils 24 to 26 are wound around the three projecting elements 28 to 30, respectively. The coils 24 to 26 are "Y" connected, as shown in FIG. 1. The iron core 27 has an annular shape. The three projecting elements 28 to 30 are spaced from each other at 120-degree intervals. The rotor 22 has a shaft 31 rotatably supported by bearings (not shown) provided in the casing 23. A magnet 32 is secured to a periphery of the rotating shaft 31. The magnet 32 has an S pole and an N pole. The S pole half of the magnet 32 extends 180 degrees in the rotating direction of the shaft 31, and the N pole half extends the other 180 degrees when viewed in cross section. The magnet 32 is exposed to the projecting members 28 to 30 of the stator 21.

The control circuit 2 includes a microcomputer, and has six output terminals (or ports) UH, VH, WH, UL, VL and WL. The output terminals UH, VH, WH, UL, VL and WL are coupled to the FETs 3 to 8, respectively, such that one output terminal is connected to one gate of an associated FET. Specifically, the output terminal UH is connected to one gate of the FET 3, the output terminal VH is connected to one gate of the FET 4, the output terminal WH is connected to one gate of the FET 5, the output terminal UL is connected to one gate of the FET 6, the output terminal VL is connected to one gate of the FET 7, and the output terminal WL is connected to one gate of the FET 8. Drains of the FETs 3 to 5 are connected to a line 42, and a voltage +B is applied to this line 42. The source of the FET 3 is connected to the drain of the FET 6 to define a source-drain connection, and a line 44 extends to one end of the coil 24 from this source-drain connection. The source of the FET 4 is connected to the drain of the FET 7 to define another source-drain connection, and a line 46 extends to one end of the coil 25 from this source-drain connection. The source of the FET 5 is connected to the drain of the FET 8, and a line 48 extends to one end of the coil 26 from the source-drain connection of the FETs 5 and 8. The sources of the FETs 6 to 8 are grounded.

Hall elements 9 to 11 are provided in the vicinity of the surface of the rotor 22 at 60-degree intervals. A voltage Vcc is applied to each of the Hall elements 9 to 11. The Hall elements 9 to 11 produce pulse signals in accordance with magnetism variations caused by rotations of the rotor 22. Output signals of the Hall elements 9 to 11 are supplied to the control circuit 2. Upon receiving the signals from the Hall elements 9 to 11, the control circuit 2 supplies drive signals to the FETs 3 to 8 from the output ports UH, VH, WH, UL, VL and WL. The drive signals designate which FET(s) among the FETs 3 to 8 should be turned on. Each FET takes a drain-source "on" condition (saturated condition) or drain-source "off" condition (shutoff condition), based on the drive signal applied thereto.

Figure 3:
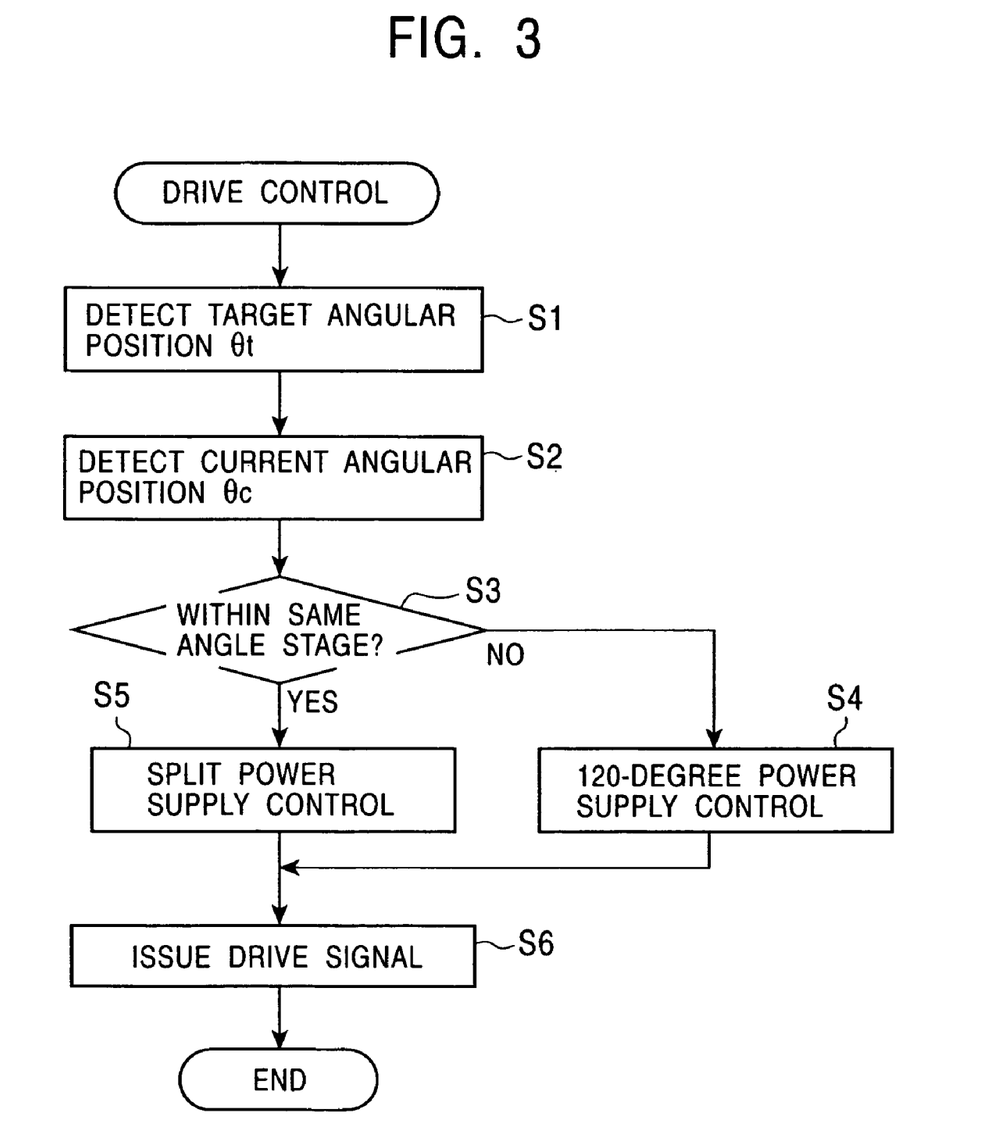
FIG. 3 illustrates a flowchart of operations performed by a control circuit of the drive apparatus shown in FIG. 1.

In this drive apparatus 40, the control circuit 2 repeatedly performs the drive control every several msec. As illustrated in FIG. 3, the control circuit 2 firstly reads a desired angle θt of the rotor 22 (Step S1) and reads a current rotation angle θc of the rotor 22 (Step S2). The desired angle θt is determined on the basis of the degree (or stroke) of depression of the accelerator pedal. The desired angle θt can take a value between 0 degree and 1800 degrees (360×5) since the brushless motor 1 rotates five times when the accelerator pedal is depressed to the maximum depressed position from a non-actuated position. The desired angle is a value between 0 degree and 1800 degrees at one-degree intervals. The angle from 0 degree to 1800 degrees is segmented into a plurality of 60-degree sections. Each 60-degree section is referred to as an "angle stage."

Figure 4:
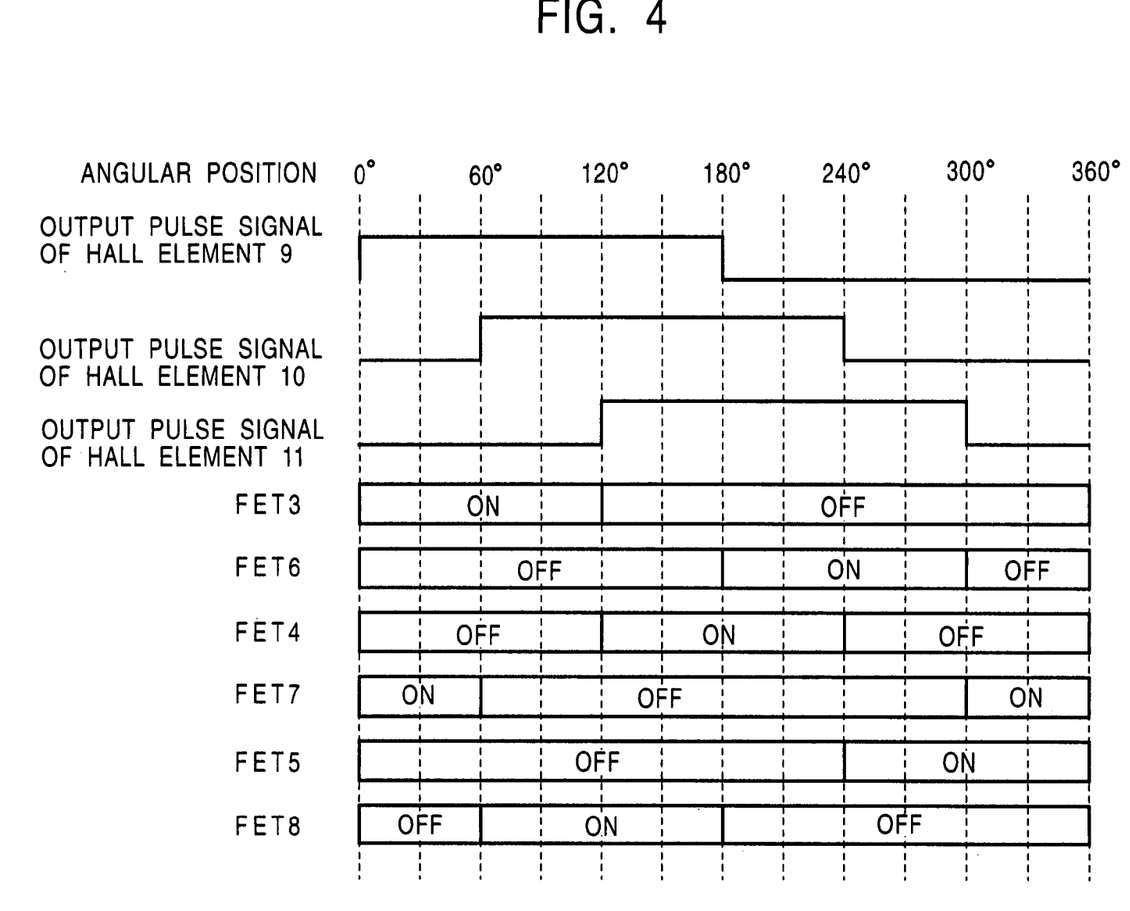
FIG. 4 is a diagram showing on and off conditions of the respective FETs during a 120-degree power supply control.

The current rotation angle θc is the current angular position of the brushless motor 1, and is determined by the control circuit 2 for every 60 degrees, based on the pulse signals issued from the Hall elements 9 to 11. As shown in FIG. 4, the pulse signals from the Hall elements 9 to 11 have a 180-degree width and 60-degree phase difference from each other. When the brushless motor 1 rotates in a normal direction, the first pulse signal is produced from the Hall element 9, the second pulse signal is produced from the Hall element 10 and the third pulse signal is produced from the Hall element 11. When the brushless motor 1 rotates in a reverse direction, the first pulse signal is generated from the Hall element 11, the second pulse signal is generated from the Hall element 10 and the third pulse signal is generated from the Hall element 9.

The control circuit 2 has a counter (not shown). For example, the counter counts the number of pulses generated from the Hall element 9 to determine the position of the rotor of the brushless motor 1. Firstly, it is determined whether the brushless motor 1 is in the first, second, third, fourth or fifth rotation. In this embodiment, n=0 when the brushless motor 1 is in the first rotation, n=1 when the brushless motor 1 is in the second rotation, n=2 when the brushless motor 1 is in the third rotation, n=3 when the brushless motor 1 is in the fourth rotation, and n=4 when the brushless motor 1 is in the fifth rotation. Subsequently, the control circuit 2 utilizes the counter to determine the motor's angle position θp (between 0 and 360 degrees) in the n'th rotation, based on the output signals of the Hall elements 9 to 11. The rotating direction of the brushless motor 1 is determined from the order of generation of the pulse signals from the Hall elements 9 to 11. Increment or decrement of the count of the counter is determined by the rotating direction of the brushless motor 1. The current rotation angle θc of the brushless motor 1 is, therefore, determined from the "n" and the angle θp:

$$\theta c = 360 \text{ degrees} \times n + \theta p$$

"n" is used to indicate the rotation stage of the brushless motor 1 in this embodiment.

After Step S2, the control circuit 2 determines whether the current rotation angle θc is in the same angle stage as the target angle θt (Step S3). In other words, it is determined whether the current angular position θc and the target angular position θt are in the same 60-degree section. If the current angular position θc is not within the same angle stage as the target angular position θt, the control circuit 2 performs 120-degree power supply control (Step S4). On the other hand, if the current angular position θc and the target angular position θt are within the same angle stage, then the control circuit 2 performs shunt (split) power supply control or high precision control (Step S5). The drive signals resulting from the control of Step S4 or S5 are supplied to the FETs 3 to 8 from the output ports UH, VH, WH, UL, VL and WL of the control circuit 2 (Step S6).

When the 120-degree power supply control is performed, a drive signal is generated in accordance with the difference (θc−θt) between the current angular position θc and the target angular position θt. The drive signal is generated such that (until) the current angular position θc enters the same angle stage as the target angular position θt. For example, when the current angular position θc is different from the target angular position θt by 375 degrees, the drive signal is generated to rotate the brushless motor 1 360 degrees towards the target angular position θt.

When the brushless motor 1 rotates in the normal direction during the 120-degree power supply control, the output pulse signal is generated from the Hall element 9, and turns on the FET 3 as shown in FIG. 4. At this point, the FET 7 is already turned on. Therefore, the drive signal of the brushless motor 1 flows in the FET 3, coil 24, coil 25 and FET 7. As a result, the rotor 22 of the brushless motor 1 rotates. When the rotor 22 rotates 60 degrees, the output pulse signal is generated from the Hall element 10. Upon generation of the output pulse from the Hall element 10, the FET 7 is turned off; and instead, the FET 8 is turned on. The drive current of the brushless motor 1 then flows in the FET 3, coil 24, coil 26 and FET 8. As a result, the rotor 22 of the brushless motor 1 rotates. When the rotor 22 rotates another 60 degrees, the output pulse signal is generated from the Hall element 11. Upon generation of the output pulse signal from the Hall element 11, the FET 3 is turned off; and instead, the FET 4 is turned on. The drive current of the brushless motor 1 then flows in the FET 4, coil 25, coil 26 and FET 8, thereby rotating the rotor 22.

When the rotor 22 of the brushless motor 1 rotates another 60 degrees, the output pulse signal is no longer generated from the Hall element 9. When the output pulse of the Hall element 9 is no longer generated, the FET 8 is turned off; and instead, the FET 6 is turned on. The drive current of the brushless motor 1 then flows in the FET 4, coil 25, coil 24 and FET 6, thereby rotating the rotor 22. When the rotor 22 rotates another 60 degrees, the output pulse is no longer generated from the Hall element 10. When the output pulse of the Hall element 10 is no longer generated, the FET 4 is turned off; and instead, the FET 5 is turned on. The drive current of the brushless motor 1 flows in the FET 5, coil 26, coil 24 and FET 6 to rotate the rotor 22. When the rotor 22 rotates another 60 degrees, the output pulse is no longer generated from the Hall element 11. When the output pulse of the Hall element 11 is no longer generated, the FET 6 is turned off; and instead, the FET 7 is turned on. The drive current of the brushless motor 1 flows in the FET 5, coil 26, coil 25 and FET 7 to rotate the rotor 22. In this manner, the rotor 22 rotates 360 degrees. By repeating the above described drive control, the brushless motor 1 can continuously rotate in the normal direction.

If the brushless motor 1 should rotate in the reverse direction, the output pulses from the Hall elements 9 to 11 turn on and off the FETs 3 to 8 in the manner opposite to the above described normal rotation control.

The above described 120-degree power supply control is carried out until the current angular position θc enters the angle stage of the target angular position θt. As the angle stage of the current angular position θc approaches the angle stage of the target angular position θt (e.g., when the angle stage difference between the current angular position θc and the target angular position θt is reduced to one angle stage), the rotation speed of the rotor 22 is reduced by reducing the amount of the currents supplied to the FETs.

When Step S3 determines that the angle stage of the current angular position θc matches the angle stage of the target angular position θt (i.e., the difference between the current angular position θc and the target angular position θt is less than 60 degrees), the control program proceeds to Step S5 to perform the shunt (split) power supply control.

Figure 5:
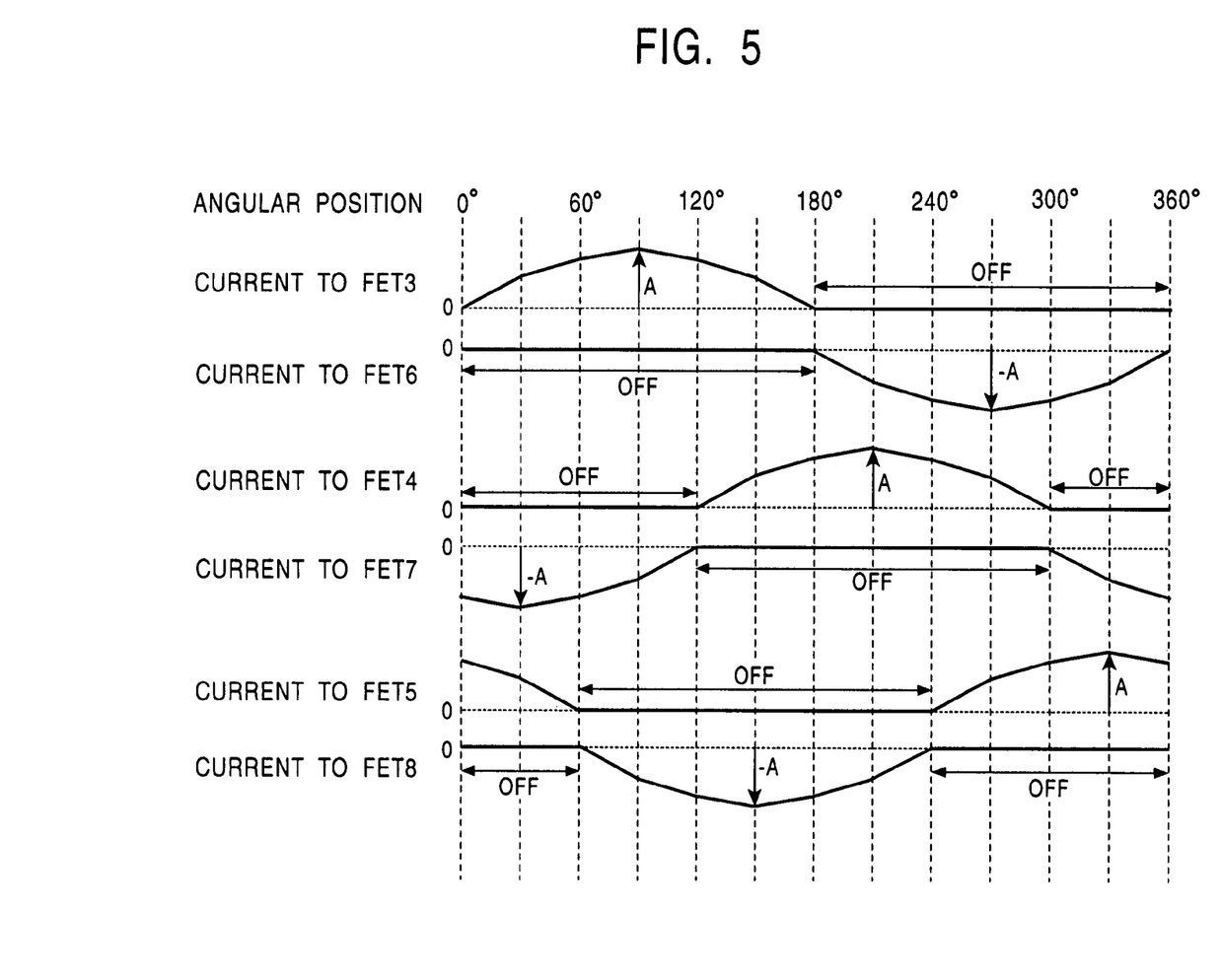
FIG. 5 is a diagram showing currents flowing in the respective FETs during a split power supply control.

During the shunt (split) power supply control, the drive signals for the FETs 3 to 8 are produced in accordance with the target angular position θt. A data map is stored in a memory 2a of the control circuit 2. The data map includes 360 sets of drive data corresponding to the 360 sets of drive signals for 360 angular positions of the brushless motor 1. One set of drive data corresponds to one set of drive signals for a particular degree of 360 degrees. Each drive data represents a value of the current. It should be noted that the brushless motor 1 can rotate five times and take 1800 angular positions, but the same 360 sets of drive signals can be repeatedly used for each rotation. The control circuit 2 reads the drive data for the target angular position θt from the data map of the memory 2a, and supplies the drive data, as the drive signals, to the FETs 3 to 8. FIG. 5 illustrates the current values, which are represented by the drive data stored in the data map, changing with the angular position of the brushless motor 1 between 0 degree and 360 degrees.

If the target angular position θt is between 0 and 59 degrees (first angle stage), the FETs 4, 6 and 8 are in the off condition. The FETs 3, 5 and 7 are in the activated condition, based on the drive signals. It should be noted, however, that if the target angular position θt is zero degree, the FET 3 is turned off. The current $I_{UH}$ flowing in the FET 3 is given by the equation: $I_{UH}=A\cdot\sin\theta t$. The current $I_{WH}$ flowing in the FET 5 is given by the equation: $I_{WH}=A\cdot\sin(\theta t+120$ degrees$)$. The current $I_{VL}$ flowing in the FET 7 is given by the equation: $I_{VL}=A\cdot\sin(\theta t-120$ degrees$)$. "A" is the maximum value of the current. If the target angular position θt is zero degree, the drive current of the brushless motor 1 flows in the FET 5, coil 26, coil 25 and FET 7, thereby causing the rotor 22 to rotate to the target angular position θt. The rotor 22 stops at the target angular position. If the target angular position θt is between 1 and 59 degrees, one drive current flows in the FET 3 and coil 24, and another drive current flows in the FET 5 and coil 26. These two drive currents merge with each other at a mutual point of the Y connection, and flow into the coil 25 and FET 7, thereby causing the rotor 22 to rotate to the target angular position θt. The rotor 22 stops at the target angular position.

If the target angular position θt is between 60 and 119 degrees, the FETs 4, 5 and 6 are in the completely off condition. The FETs 3, 7 and 8 are activated by the drive signals. It should be noted, however, that if the target angular position θt is 60 degrees, the FET 8 is turned off. The current $I_{UH}$ supplied to the FET 3 is given by the equation: $I_{UH}=A\cdot\sin\theta t$. The current $I_{VL}$ supplied to the FET 7 is given by the equation: $I_{VL}=A\cdot\sin(\theta t-120$ degrees$)$. The current $I_{WL}$ supplied to the FET 8 is given by the equation: $I_{WL}=A\cdot\sin(\theta t+120$ degrees$)$. If the target angular position θt is 60 degrees, the drive current of the brushless motor 1 flows in the FET 3, coil 24, coil 25 and FET 7, thereby causing the rotor 22 to rotate to the target angular position θt. The rotor 22 stops at the target angular position. If the target angular position θt is between 61 and 119 degrees, the drive current flows in the FET 3 and coil 24, and branches at the branching point of the Y connection so that one drive current flows into the coil 25 and FET 7 and the other drive current flows into the oil 26 and FET 8, thereby causing the rotor 22 to rotate to the target angular position θt. The rotor 22 stops at the target angular position.

If the target angular position θt is between 120 and 179 degrees, the FETs 5, 6 and 7 are in the completely off condition. The FETs 3, 4 and 8 are activated by the drive signals. It should be noted, however, that if the target angular position θt is 120 degrees, the FET 4 is turned off. The current $I_{UH}$ supplied to the FET 3 is given by the equation: $I_{UH}=A\cdot\sin\theta t$. The current $I_{VH}$ supplied to the FET 4 is given by the equation: $I_{VH}=A\cdot\sin(\theta t-120$ degrees$)$. The current $I_{WL}$ supplied to the FET 8 is given by the equation: $I_{WL}=A\cdot\sin(\theta t+120$ degrees$)$. If the target angular position θt is 120 degrees, the drive current of the brushless motor 1 flows in the FET 3, coil 24, coil 26 and FET 8, thereby causing the rotor 22 to rotate to the target angular position θt. The rotor 22 stops at the target angular position. If the target angular position θt is between 121 and 179 degrees, one drive current flows in the FET 3 and coil 24 and the other drive current flows in the FET 4 and coil 25. These two drive currents join with each other at the meeting point of the Y connection and flows in the coil 26 and FET 8, thereby causing the rotor 22 to rotate to the target angular position θt. The rotor 22 stops at the target angular position.

If the target angular position θt is between 180 and 239 degrees, the FETs 3, 5 and 7 are in the completely off condition. The FETs 4, 6 and 8 are activated by the drive signals. It should be noted, however, that if the target angular position θt is 180 degrees, the FET 6 is turned off. The current $I_{VH}$ for the FET 4 is given by the equation: $I_{VH}=A\cdot\sin(\theta t-120\text{ degrees})$. The current $I_{UL}$ for the FET 6 is given by the equation: $I_{UL}=A\cdot\sin\theta t$. The current $I_{WL}$ for the FET 8 is given by the equation: $I_{WL}=A\cdot\sin(\theta t+120\text{ degrees})$. If the target angular position θt is 180 degrees, the drive current of the brushless motor 1 flows in the FET 4, coil 25, coil 26 and FET 8, thereby causing the rotor 22 to rotate to the target angular position θt (=180 degrees). The rotor 22 stops at the target angular position. If the target angular position θt is between 181 and 239 degrees, the drive current flows in the FET 4 and coil 25 and branches at the branching point of the Y connection. One drive current then flows into the coil 24 and FET 6, and the other drive current flows into the coil 26 and FET 8, thereby causing the rotor 22 to rotate to the target angular position θt. The rotor 22 stops at the target angular position.

If the target angular position θt is between 240 and 299 degrees, the FETs 3, 7 and 8 are in the completely off condition. The FETs 4, 5 and 6 are brought into the activated condition, based on the drive signals. It should be noted, however, that if the target angular position θt is 240 degrees, the FET 5 is turned off. The current $I_{VH}$ for the FET 4 is given by the equation: $I_{VH}=A\cdot\sin(\theta t-120\text{ degrees})$. The current $I_{WH}$ for the FET 5 is given by the equation: $I_{WH}=A\cdot\sin(\theta t+120\text{ degrees})$. The current $I_{UL}$ for the FET 6 is given by the equation: $I_{UL}=A\cdot\sin\theta t$. If the target angular position θt is 240 degrees, the drive current of the brushless motor 1 flows in the FET 4, coil 25, coil 24 and FET 6, thereby causing the rotor 22 to rotate to the target angular position θt (=240 degrees). The rotor 22 stops at the target angular position. If the target angular position θt is between 241 and 299 degrees, one drive current flows in the FET 4 and coil 25 and the other drive current flows in the FET 5 and coil 26. These drive currents join with each other at the mutual point of the Y connection, and flow in the coil 24 and FET 6, thereby causing the rotor 22 to rotate to the target angular position θt. The rotor 22 stops at the target angular position.

If the target angular position θt is between 300 and 359 degrees, the FETs 3, 4 and 8 are in the completely off condition. The FETs 5, 6 and 7 are brought into the activated condition by the drive signals. It should be noted, however, that if the target angular position θt is 300 degrees, the FET 7 is turned off. The current $I_{WH}$ for the FET 5 is given by the equation: $I_{WH}=A\cdot\sin(\theta t+120\text{ degrees})$. The current $I_{UL}$ for the FET 6 is given by the equation: $I_{UL}=A\cdot\sin\theta t$. The current $I_{VL}$ for the FET 7 is given by the equation: $I_{VL}=A\cdot\sin(\theta t-120\text{ degrees})$. If the target angular position θt is 300 degrees, the drive current of the brushless motor 1 flows in the FET 5, coil 26, coil 24 and FET 6, thereby causing the rotor 22 to rotate to the target angular position θt (=300 degrees). The rotor 22 stops at the target angular position. If the target angular position θt is between 301 and 359 degrees, the drive current flows in the FET 5 and coil 26 and branches at the branching point of the Y connection. One drive current flows in the coil 24 and FET 6, and the other drive current flows in the coil 25 and FET 7, thereby causing the rotor 22 to rotate to the target angular position θt. The rotor 22 stops at the target angular position.

For each of the subsequent 360 degrees, the same process is performed.

The split power supply control, therefore, can control the rotation angle of the rotor 22 with the intervals considerably smaller than the 120-degree power supply control. Specifically, the split power supply control controls the angular position (rotation angle) of the rotor 22 at one-degree intervals whereas the 120-degree power supply control controls the angular position of the rotor 22 at 60-degree intervals. As a result, it is possible to control the angular position of the electronic throttle valve, which moves in connection with the rotor 22, precisely with respect to the target angular position θt.

In the above described embodiment, when the maximum current A flows in a coil, the FET connected to that coil may be either in the off condition or the activated condition.

If it is determined at Step S3 that the current angular position θc and the target angular position θt are not in the same angle stage, the 120-degree power supply control is performed in the above described embodiment. It should be noted, however, that alternatively the split power supply control may be performed to rotate the rotor 22 at, for example, 30-degree intervals.

The drive apparatus for the brushless motor is used for controlling the electronic throttle valve in the above described embodiments. It should be noted, however, that the drive apparatus can be applied to a brushless motor of a power sliding door or a power window.

This application is based on a Japanese patent application No. 2002-266390, and the entire disclosure thereof is incorporated herein by reference.

What is claimed is:

1. A drive apparatus for a brushless motor, the brushless motor including a rotor having opposite magnetic poles arranged on a periphery of the rotor, and a stator facing the rotor and having at least three interconnected coils at equal angular intervals, the drive apparatus comprising:
   a memory unit for storing drive data which represent drive currents to be supplied to the respective coils at each of predetermined angular positions of the rotor;
   a control unit for reading those drive data which best match a target angular position of the rotor, from the memory unit, and for generating drive signals based on the read drive data;
   a drive circuit for supplying the drive currents to the respective coils, based on the generated drive signals; and
   a detector for detecting a current angular position of the rotor, and
   wherein, when a difference between the current angular position of the rotor and the target angular position is greater than a predetermined value, the control unit does not read the drive data from the memory unit, and instead selects two of the three coils based on the angular position difference and supplies signals to the drive circuit so as to supply appropriate currents to the selected two coils, until the angular position difference is not greater than the predetermined value.

2. The drive apparatus according to claim 1, wherein the predetermined value is 60 degrees.

3. The drive apparatus according to claim 1, wherein the brushless motor controls movement of an electronic throttle valve of an engine.

4. The drive apparatus according to claim 3, wherein the target angular position of the rotor is determined by a position of an accelerator pedal.

5. The drive apparatus according to claim 1, wherein the drive circuit includes a plurality of field-effect transistors.

6. The drive apparatus according to claim 1, wherein the detector includes at least one Hall element.

7. The drive apparatus according to claim 1, wherein the at least three interconnected coils are 3×n coils (n is a natural number).

8. A method for driving a brushless motor, the brushless motor including a rotor having opposite magnetic poles arranged on a periphery of the rotor, and a stator facing the rotor and having at least three interconnected coils at equal-angular intervals, the method comprising:

storing, in a memory, drive data which represent drive currents to be supplied to the respective coils at each of predetermined angular positions of the rotor;

reading those drive data which best match a target angular position of the rotor, from the memory;

generating drive signals based on the read drive data;

supplying the drive currents to the respective coils based on the generated drive signals, respectively, and detecting a current angular position of the rotor, and wherein when a difference between the current angular position of the rotor and the target angular position is greater than a predetermined value, the method further comprises selecting two of the three coils based on the angular position difference and supplying appropriate currents to the selected two coils, until the angular position difference is not greater than the predetermined value, prior to reading the drive data from the memory.

9. The method according to claim 8, wherein the predetermined value is 60 degrees.

10. The method according to claim 8, wherein the brushless motor controls movement of an electronic throttle valve of an engine.

11. The method according to claim 10, wherein the target angular position of the rotor is determined by a position of an accelerator pedal.

12. The method according to claim 8, wherein the at least three interconnected coils are 3×n coils (n is a natural number).

* * * * *